United States Patent
Ezawa et al.

(10) Patent No.: US 8,917,463 B2
(45) Date of Patent: Dec. 23, 2014

(54) LENS UNIT

(75) Inventors: Kozo Ezawa, Osaka (JP); Teruyuki Takizawa, Osaka (JP); Shinji Uchida, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 13/807,951

(22) PCT Filed: Jul. 6, 2011

(86) PCT No.: PCT/JP2011/003879
§ 371 (c)(1),
(2), (4) Date: Jan. 2, 2013

(87) PCT Pub. No.: WO2012/004995
PCT Pub. Date: Jan. 12, 2012

(65) Prior Publication Data
US 2013/0107381 A1 May 2, 2013

(30) Foreign Application Priority Data
Jul. 7, 2010 (JP) .................................. 2010-154522

(51) Int. Cl.
*G02B 7/02* (2006.01)
*G02B 7/04* (2006.01)
(52) U.S. Cl.
CPC . *G02B 7/04* (2013.01); *G02B 7/023* (2013.01)
USPC .......................................... 359/823; 359/822
(58) Field of Classification Search
USPC ........................... 359/694–706, 817, 819–830
See application file for complete search history.

(56) References Cited

U.S. PATENT DOCUMENTS

2007/0076309 A1  4/2007  Shimizu et al.

FOREIGN PATENT DOCUMENTS

| JP | 04-225307 A | 8/1992 |
| JP | 07-113938 A | 5/1995 |
| JP | 2004-085706 A | 3/2004 |
| JP | 2006-011234 A | 1/2006 |
| JP | 2007-094241 A | 4/2007 |
| JP | 2007-187776 A | 7/2007 |
| JP | 2007-310067 A | 11/2007 |
| JP | 2009-020429 A | 1/2009 |
| JP | 2009-086567 A | 4/2009 |

OTHER PUBLICATIONS

International Search Report for corresponding International Application No. PCT/JP2011/003879 mailed Aug. 16, 2011.
International Preliminary Report on Patentability for corresponding International Application No. PCT/JP2011/003879 dated Oct. 23, 2012.

*Primary Examiner* — Mahidere Sahle
(74) *Attorney, Agent, or Firm* — Renner, Otto, Boisselle & Sklar, LLP

(57) ABSTRACT

A lens unit according to the present invention includes: a first lens group and a second lens group being disposed in series on the same optical axis to have a light-converging function, the first lens group and the second lens group each including at least one lens; a first lens barrel 1 retaining the first lens group; a second lens barrel 2 retaining the second lens group and encasing at least a portion of the first lens barrel; and an adjustment mechanism for adjusting relative positioning along an optical axis direction, tilt between respective optical axes, and mutual radial deviation, of the first lens barrel and the second lens barrel.

7 Claims, 13 Drawing Sheets

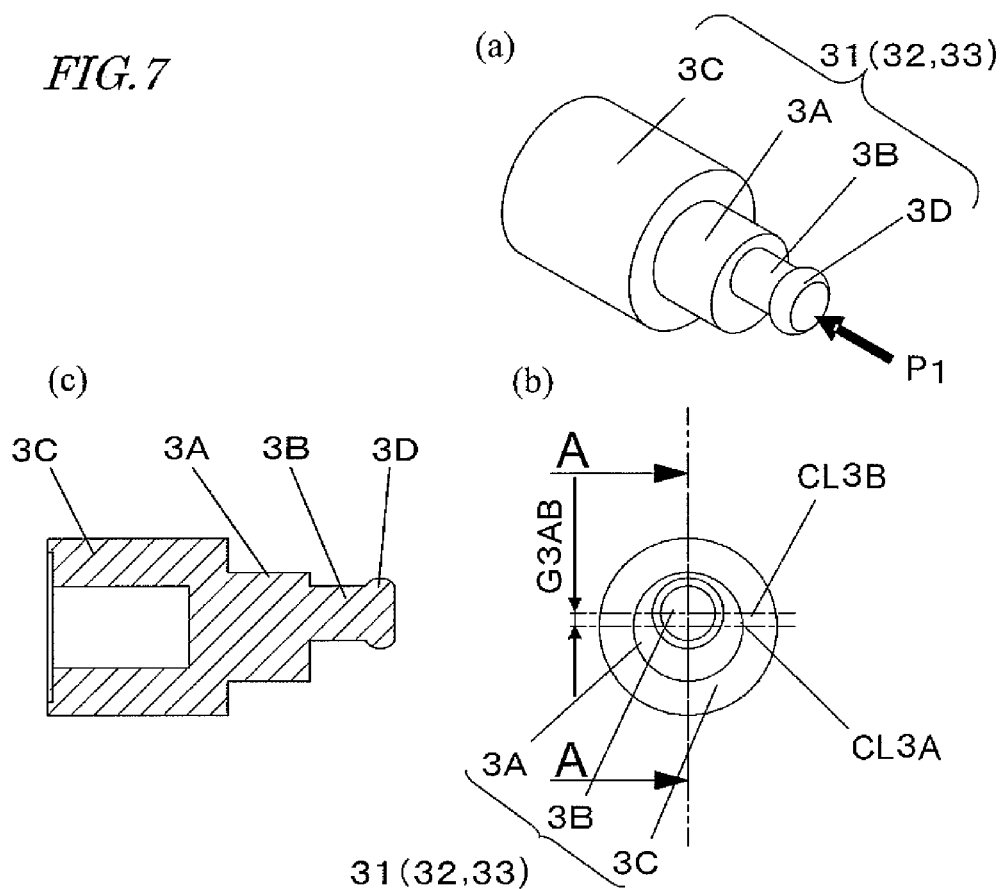
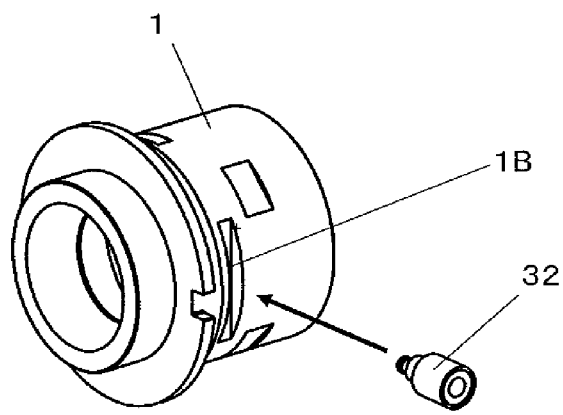

FIG.19
(a)
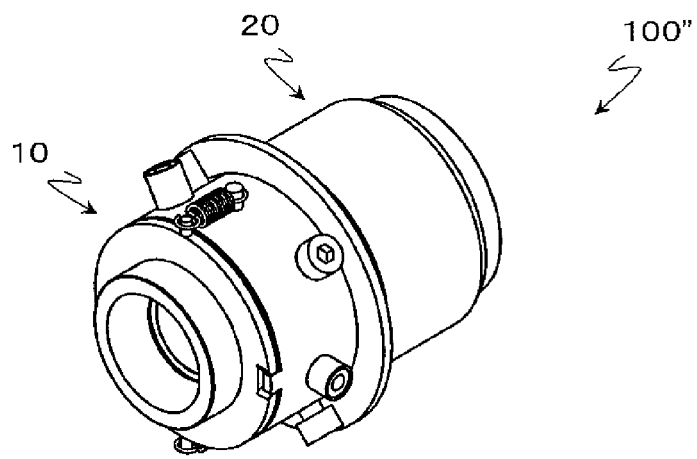
(b)
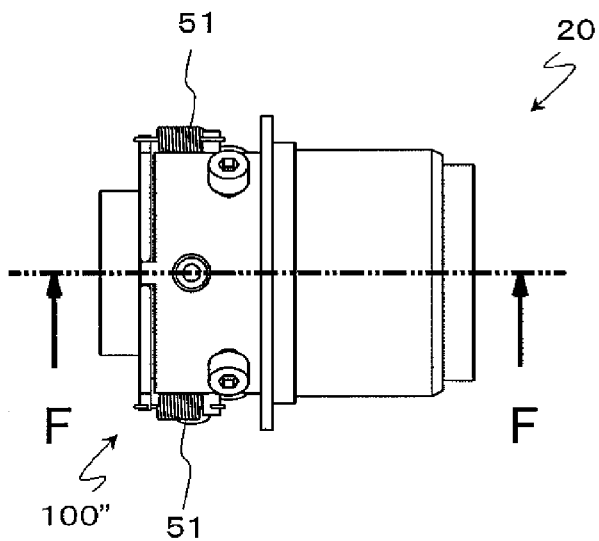
(c)
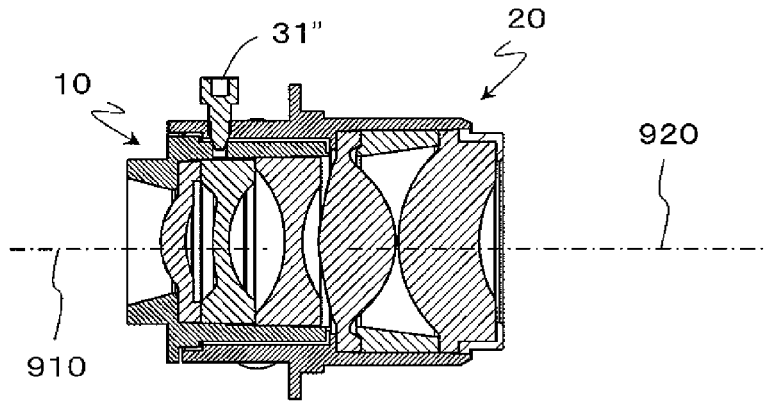

1

LENS UNIT

TECHNICAL FIELD

The present invention relates to a lens unit having a plurality of optical lenses, and more particularly to a lens unit which is to be used for camera devices and the like and which has excellent assemblability.

BACKGROUND ART

With advancement in technology, digital still cameras (also called digital cameras) have rapidly become prevalent, and mobile phones having integrated cameras are now commodity. This has led to the increasing needs for techniques to realize downsized camera devices. Another requirement for camera devices is that images taken with them must have a high image quality.

Generally speaking, a camera device includes a lens unit composed of a plurality of lenses for forming an image on the imaging surface of an imaging device. The performance of a camera device, such as resolution, is considerably influenced by the design of a barrel of the lens unit, precision of the parts, precision of assembly when installing the lenses, and so on. Therefore, when assembling a lens unit, attention must be paid to the method of adjustment when installing the lenses.

Patent Document 1 discloses a method of interconnecting a plurality of lenses, with their optical axes being adjusted, to produce a lens block of an integral structure. With reference to FIG. 20 and FIG. 21, the conventional lens block assembly method disclosed in Patent Document 1 will be described.

FIG. 20 is a perspective view showing a procedure of inserting lenses into a fixing jig, and FIG. 21 is a view of a cross section containing the optical axis of the lenses having been inserted into the fixing jig. As shown in FIG. 20, a first lens 810, a second lens 820, a third lens 830, and a fourth lens 840 are sequentially installed into a fixing jig 710, such that, as shown in FIG. 21, the lenses, one being stacked upon another, are supported by the fixing jig 710.

In this state, an adhesive is injected through first throughholes 711A, 711B, and 711C, second throughholes 712A, 712B, and 712C, third throughholes 713A, 713B, and 713C, and fourth throughholes 714A, 714B, and 714C penetrating through the fixing jig 710 from its outer surface to its inner surface, whereby the first lens 810, the second lens 820, the third lens 830, and the fourth lens 840 are adhesively bonded to one another. As a result, a lens block with the four integral lenses is completed. According to Patent Document 1, radial deviation of the lenses can be adjusted by inserting a jig rod into each throughhole and moving the lenses before the adhesive bonding. The assembled lens block is fixed to a barrel of the camera device.

On the other hand, Patent Document 2 and Patent Document 3 disclose methods where radial deviation of lenses with respect to a lens barrel 710 is adjusted by inserting a jig via throughholes like the first throughholes 711A, 711B, and 711C, second throughholes 712A, 712B, and 712C, third throughholes 713A, 713B, and 713C, and fourth throughholes 714A, 714B, and 714C shown in FIG. 20 and FIG. 21.

CITATION LIST

Patent Literature

[Patent Document 1] Japanese Laid-Open Patent Publication No. 2007-94241
[Patent Document 2] Japanese Laid-Open Patent Publication No. 2007-187776
[Patent Document 3] Japanese Laid-Open Patent Publication No. 2004-85706

SUMMARY OF INVENTION

Technical Problem

However, using the method disclosed in Patent Document 1 or the methods disclosed in Patent Documents 2 and 3 to adjust the radial deviation of the lenses each time would detract from workability, and makes it difficult to adjust the radial deviation of the lenses with a high precision. Moreover, there are limits to decreasing the radial deviation of the lenses toward obviating adjustments.

Moreover, higher and higher-precision optics are desired in recent years, making it necessary to adjust not only the radial deviation of the lenses, but also intervals between the lenses and their tilts and the like; otherwise, it would be difficult to attain satisfactory performance.

The present invention is meant to solve at least one of such conventional problems, and aims to provide a lens unit which permits high-precision adjustment of lens positions and the like by a simple method, and which ensures stable performance.

Solution to Problem

A lens unit according to the present invention comprises: a first lens group and a second lens group being disposed in series on a same optical axis to have a light-converging function, the first lens group and the second lens group each including at least one lens; a first lens barrel retaining the first lens group; a second lens barrel retaining the second lens group and encasing at least a portion of the first lens barrel; and an adjustment mechanism provided in a region of the first lens barrel and the second lens barrel where the second lens barrel encases at least a portion of the first lens barrel, the adjustment mechanism being for adjusting at least one of: relative positioning along an optical axis direction, tilt between respective optical axes, and mutual radial deviation, of the first lens barrel and the second lens barrel.

In a preferred embodiment, for adjusting the relative positioning along the optical axis direction and the tilt between the respective optical axes, the adjustment mechanism includes at least one adjustment pin supported by the second lens barrel so as to be capable of pivoting, and at least one adjustment groove located on an outer surface of the first lens barrel; the at least one adjustment pin includes a guide axis portion of a cylindrical shape whose center defines a guide axis center around which the pivoting is to occur, and an eccentric portion having an eccentric axis center which is eccentric from the guide axis center and having, in at least a portion thereof, a circular cross section centered around the eccentric axis center; the guide axis portion is inserted in a guide hole so as to be capable of pivoting, the guide hole having an axis center along a radial direction of the second lens barrel; the eccentric portion is engaged in the at least one adjustment groove of the first lens barrel; and when the at least one adjustment pin is pivoted around the guide axis portion, a portion of the at least one adjustment groove abutting with the eccentric portion moves along the optical axis direction.

In a preferred embodiment, the adjustment mechanism includes three each of said at least one adjustment pin and said at least one adjustment groove; and the three adjustment pins are disposed on an outer surface of the second lens barrel at an interval of 120 degrees centered around the optical axis.

In a preferred embodiment, when the three adjustment pins are simultaneously pivoted in a same direction and with a same velocity, the first lens barrel is moved relative to the second lens barrel in parallel to the optical axis direction; and when at least one of the three adjustment pins is pivoted in a different direction or with a different velocity from that of any other, the optical axis of the first lens barrel is tilted with respect to the optical axis of the second lens barrel.

In a preferred embodiment, the eccentric portion of each adjustment pin has a bloated barrel surface in at least a portion thereof, the eccentric portion achieving point contact with the adjustment groove at a portion of the bloated barrel surface.

In a preferred embodiment, for adjusting mutual radial deviation between the first lens barrel and the second lens barrel, the adjustment mechanism further includes at least one adjustment screw and at least one loading spring, the at least one adjustment screw being supported by the second lens barrel so as to be capable of pivoting; the at least one adjustment screw includes a ridged screw portion, a screw head portion located at one end along an axial direction, and a pressurizing bulge located at another end along the axial direction; the screw portion is screwed into a screw hole, an axial direction of the screw hole being a radial direction in a cross section of the second lens barrel that is perpendicular to the optical axis; the pressurizing bulge abuts against a screw abutment face provided on an outer surface of the first lens barrel, the screw abutment face being orthogonal to an axis center of the at least one adjustment screw; and the at least one loading spring is coaxial with the at least one adjustment screw supported by the second lens barrel, and presses the first lens barrel from the second lens barrel toward the optical axis of the first barrel.

In a preferred embodiment, the first lens barrel moves relative to the second lens barrel in a direction in which the adjustment screw proceeds when the adjustment screw is pivoted in the screw hole.

In a preferred embodiment, the adjustment mechanism includes two each of said at least one adjustment screw and said at least one loading spring; and the two adjustment screws, respectively, and the two loading springs, respectively, are located on two lines orthogonally intersecting at a point on a plane which is perpendicular to the optical axis of the first lens barrel and at which the optical axis is located.

In a preferred embodiment, the pressurizing bulge of each adjustment screw has a hemispheric portion, the hemispheric cross-sectional portion abutting against the screw abutment face; and the first lens barrel moves relative to the second lens barrel in a direction in which the adjustment screw proceeds when the adjustment screw is pivoted in the screw hole.

In a preferred embodiment, among tolerances in lens assembly concerning an entire lens optics including the first lens group and the second lens group, a tolerance in assembly for satisfying a required performance between a lens of the first lens group installed in the first lens barrel that is located the closest to the second lens barrel and a lens of the second lens group installed in the second lens barrel that is located the closest to the first lens barrel is smaller than a tolerance in assembly between any other lenses.

Advantageous Effects of Invention

In accordance with a lens unit of the present invention, after the respective lenses are mounted in the first lens barrel and the second lens barrel, positioning along the optical axis direction, tilt of the optical axes, and radial deviation between the first lens barrel and the second lens barrel can be adjusted anew, whereby a lens unit with an increased precision can be constructed.

Moreover, in accordance with a lens unit of the present invention, since an adjustment pin for adjusting the position of the first lens barrel relative to the second lens barrel along the optical axis direction is provided, it is possible to adjust the position of first barrel relative to the second barrel along the optical axis direction with a simple construction.

Moreover, in accordance with a lens unit of the present invention, adjustment pins are provided in three places at an equal interval, thereby allowing the position of the first lens barrel relative to the second lens barrel along a direction which is parallel to the optical axis, and the tilt therebetween, to be both adjusted.

Moreover, in accordance with a lens unit of the present invention, the first lens barrel can smoothly operate with respect to the adjustment pins, based on a construction where the adjustment pins are in point contact with the adjustment grooves.

Moreover, in accordance with a lens unit of the present invention, since adjustment screws are provided for adjusting the positions of the first lens barrel relative to the second lens barrel along a radial direction, it becomes possible to make an eccentricity adjustment of the first barrel relative to the second barrel with a simple construction.

Moreover, in accordance with a lens unit of the present invention, adjustment screws are provided in two places on mutually orthogonal axial lines, thus allowing the position of the first lens barrel relative to the second lens barrel to be moved along each of biaxial directions, whereby movements in any direction orthogonal to the optical axis are enabled.

Moreover, in accordance with a lens unit of the present invention, at a hemispheric portion which is at one end face, each adjustment screw abuts against a bearing plane. Therefore, even when the tilt angle of the adjustment screw with respect to the first lens barrel changes, the state of abutment does not significantly change; as a result, adjustments of the first lens barrel relative to the second lens barrel with the adjustment pins can also occur smoothly.

Moreover, in accordance with a lens unit of the present invention, among the errors to occur when installing the lenses, a smaller amount of tolerance is allowed for the assembly error between the first lens barrel and the second lens barrel than for the assembly error of any other lens. Thus, it is possible to perform a high precision adjustment only at the assembly step between the first lens barrel and the second lens barrel, while relaxing the precision of adjustment in the assembly step of any other lens. This makes it possible to reduce the number of adjustment steps, and also improve the entire lens unit to higher levels of perfection.

BRIEF DESCRIPTION OF DRAWINGS

FIGS. 7 (*a*), (*b*), and (*c*) are a perspective view, front view, and a cross-sectional view of an adjustment pin of an embodiment.

FIG. 8 A perspective view showing how an adjustment pin of an embodiment may be installed.

FIGS. 19 (*a*), (*b*), and (*c*) are a perspective view and a side view of an embodiment of a lens unit in which adjustment pins as shown in FIG. 17 are used, and a cross-sectional view at position F-F of the view shown in (*b*).

DESCRIPTION OF EMBODIMENTS

Hereinafter, an embodiment of a lens unit according to the present invention will be described.

First, with reference to FIG. 1 to FIG. 5, the overall construction of the lens unit will be described.

Figure 1:
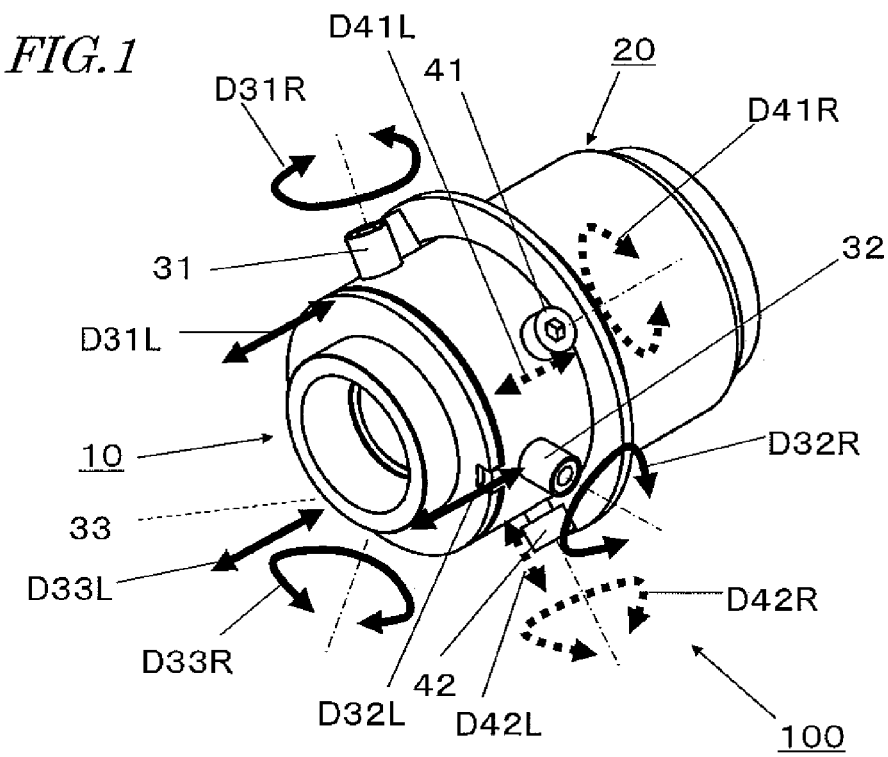
FIG. 1 A perspective view showing the entirety of an embodiment of a lens unit according to the present invention.

As shown in FIG. 1, a lens unit 100 includes a first unit 10 and a second unit 20.

Figure 2:
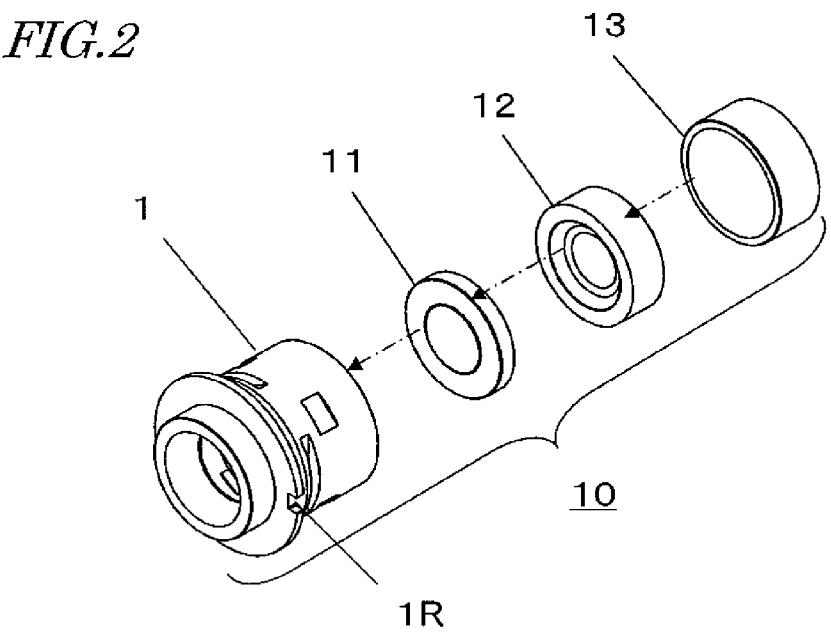
FIG. 2 An exploded perspective view of a first lens barrel of a lens unit of an embodiment.

As shown in FIG. 2, the first unit 10 includes: a first lens barrel 1; and a first group of lenses each of which is inserted into the first lens barrel 1, i.e., a first lens 11, a second lens 12, and a third lens 13.

Figure 3:
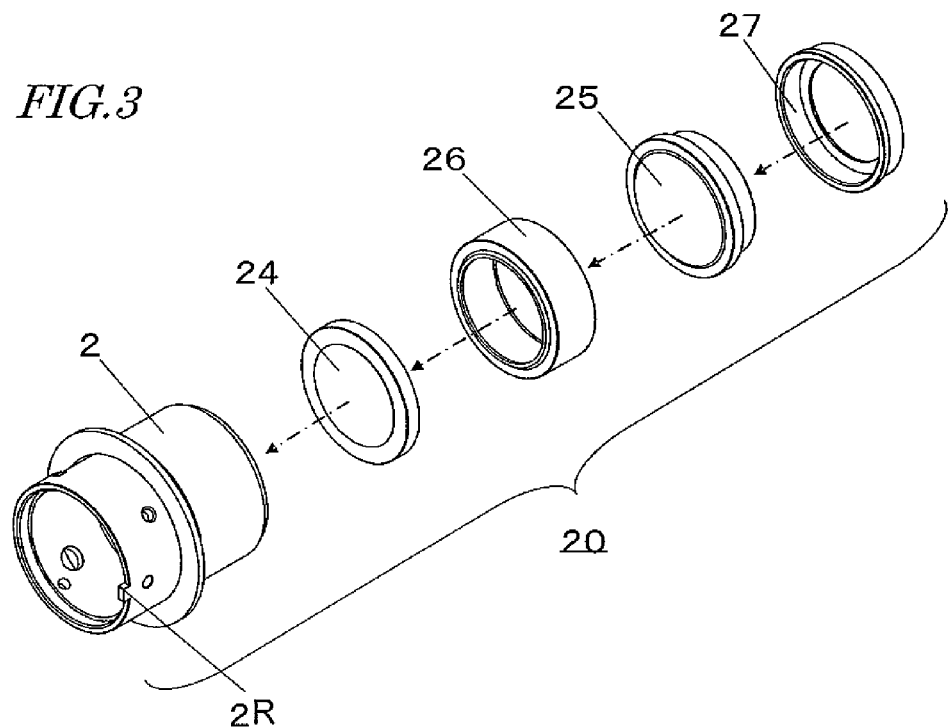
FIG. 3 An exploded perspective view of a second lens barrel of a lens unit of an embodiment.

As shown in FIG. 3, the second unit 20 includes: a second lens barrel 2 and a second group of lenses each of which is inserted into the second lens barrel 2, i.e., a fourth lens 24 and a fifth lens 25; a spacer 26; and a lens retainer 27. The spacer 26 defines an interval between the fourth lens 24 and the fifth lens 25. The lens retainer 27 prevents the fourth lens 24 and the fifth lens 25 from dropping out of the second lens barrel 2. The second lens barrel 2 has an inner surface which contains at least a portion of the first lens barrel 1. The first lens group and the second lens group are disposed in series on the same optical axis, thus exhibiting a predetermined light-converging function which is required of the lens unit 100.

Figure 4:
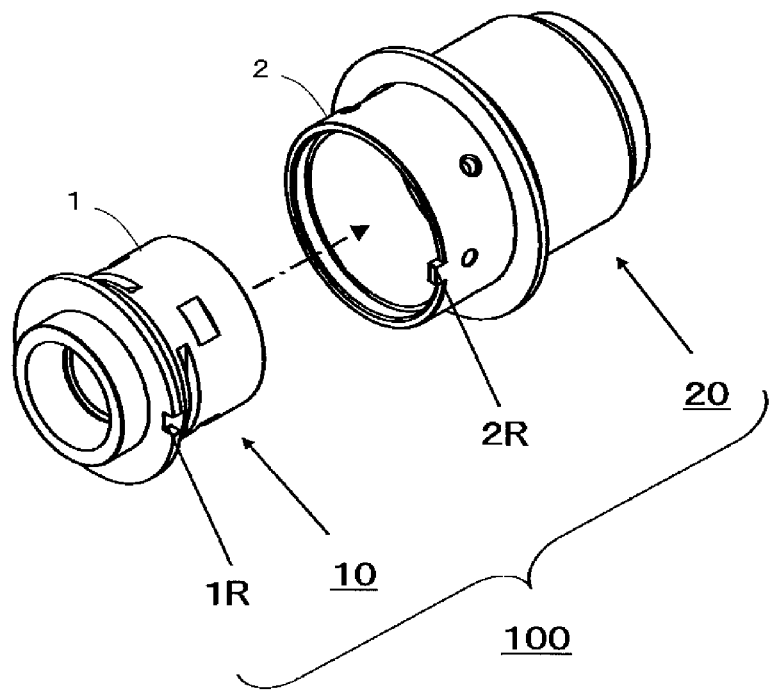
FIG. 4 A unit exploded perspective view of a lens unit of an embodiment.
Figure 5:
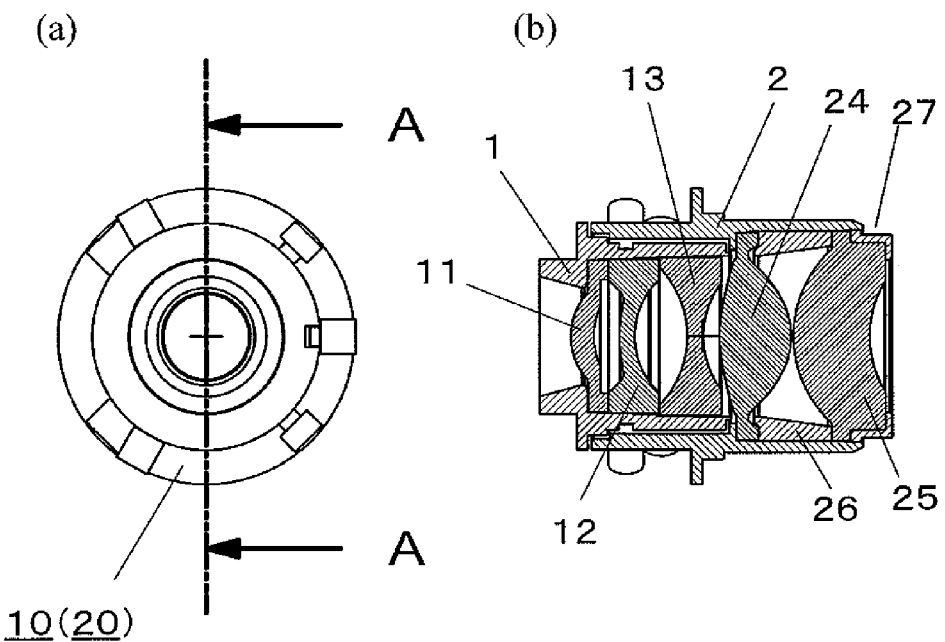
FIGS. 5 (a) and (b) are a front view of a lens unit of an embodiment and a cross-sectional view at position A-A of the view shown in (a).

After the respective lenses are inserted as shown in FIG. 4, the first unit 10 is inserted into the second barrel 2 of the second unit 20. An alignment guide recess 1R is provided in the first lens barrel 1, while an alignment guide bump 2R is provided on the second lens barrel. The alignment guide recess 1R and the alignment guide bump 2R fit together, whereby the alignment of the angular positions of the lens barrels along the direction of rotation is uniquely determined. FIGS. 5(*a*) and (*b*) are a front view and a cross-sectional view of the lens unit 100 having been assembled in this manner.

Next, the reason why the first unit 10 and the second unit 20 are split will be described. Generally speaking, in a lens unit lacking a zoom driving or focus driving mechanism, when lenses are installed into a lens unit, all lens are to be sequentially installed into a single lens barrel. Under specifications such that high precision in position is not required between lenses, offsets of lenses with respect to the lens barrel are tolerated within the range of precision variation of the outer finished dimensions of each lens and the lens barrel. However, when the offsets of the lenses with respect to the lens barrel are not tolerated even within the range of precision variation of the outer finished dimensions of each lens and the lens barrel, the amounts of offset need to be fine-adjusted. In this case, each time one lens is installed, while measuring the reflection eccentricity, MTF (Modulation Transfer Function), and the like of each lens, the lens positions are adjusted so that the optical axis of those lenses which have already been inserted coincides with the optical axis of the lens which is just insert.

However, in the case where the required precision is high, such a method does not allow the optical axes of the lenses to coincide with a sufficiently high precision. In this case, the aforementioned method is followed, or the required precision is even lowered for the installation of each lens, while special adjustments are intensively made for some of the lenses. In other words, within the lens unit, lenses to be intensively subjected to a high precision adjustment are separated from other lenses, and then the adjustments are made.

In the present embodiment, the lens unit includes five lenses, for example. The optics is designed so that the lens optics will attain a high-precision performance throughout the entire lens unit when the optical axes of the third lens 13 and the fourth lens 24 above all, preferably, are adjusted with a high precision. In other words, among the tolerances in lens assembly concerning the entire lens unit, the tolerance in assembly for satisfying the required performance between the lens of the first lens group installed in the first lens barrel 1 that is located the closest to the second lens barrel 2 and the lens of the second lens group installed in the second lens barrel 2 that is located the closest to the first lens barrel 1 is smaller than the tolerance in assembly between any other lenses. Therefore, the lens unit optics is split between the first unit 10, in which the first lens 11, the second lens 12, and the third lens 13 are installed, and the second unit 20, in which the fourth lens 24 and the fifth lens 25 are installed, and the offset and tilt between the optical axes of the third lens 13 and the fourth lens 24, as well as the interval between these lenses, are adjusted with a high precision.

Although the first unit 10 includes three lenses and the second unit includes two lenses in the present embodiment, it suffices if the first unit 10 and the second unit 20 each includes at least one lens. Moreover, it is preferable that, among the plurality of lenses composing the lens unit, plural lenses are allocated in the first unit 10 and the second unit 20 in such a manner as to enable adjustment between the optical axes of two adjacent lenses that most significantly affect the optical performance of the lens unit optics, as described above. For example, in the case where the lens unit includes seven lenses, such that the offset between the optical axes of the third and fourth lenses exerts more influence on the performance of the entire lens unit optics than does the offset between the optical axes of any other lenses, it is preferable to allocate the first to third lenses in the first unit 10 and fourth to seventh lenses in the second unit 20. When the first lens group and the second lens group are designed so as to have such optical characteristics, it becomes possible, by using the lens unit of the present embodiment, to adjust the lens positions so that the optical performance of the entire lens unit becomes highest, through a simple method.

However, the present invention is not limited to the case where the tolerance in lens assembly between two adjacent lenses from the first lens group and the second lens group is the smallest. For example, a design may be adopted where the two adjacent lenses having the smallest tolerance in lens assembly are disposed so as to sandwich a spacer 26 therebetween, such that the spacer 26 helps the alignment error to fall within the tolerance in lens assembly. Without being limited to a spacer 26, a design may be adopted where any other means that is provided in the lens unit ensures that the alignment error falls within the tolerance in lens assembly. In this case, even under a design such that the tolerance in lens assembly between two adjacent lenses from the first lens group and the second lens group has the second lowest value, it is possible to adjust the lens positions so that the optical performance of the entire lens unit becomes highest. Moreover, in the case where no other alignment means is provided in the lens unit, and the tolerance in lens assembly between two adjacent lenses from the first lens group and the second lens group is not the smallest, at least the alignment and adjustment of the tilt between the optical axes of the first lens group and the second lens group can be performed in a simple manner, thus making the lens assembly easier than conventional.

Next, a method of adjusting a tilt between the optical axis of the first unit 10 and the optical axis of the second unit 20, and the positions of the two along the optical axis direction, will be described with reference to FIG. 6 to FIG. 10.

Figure 6:
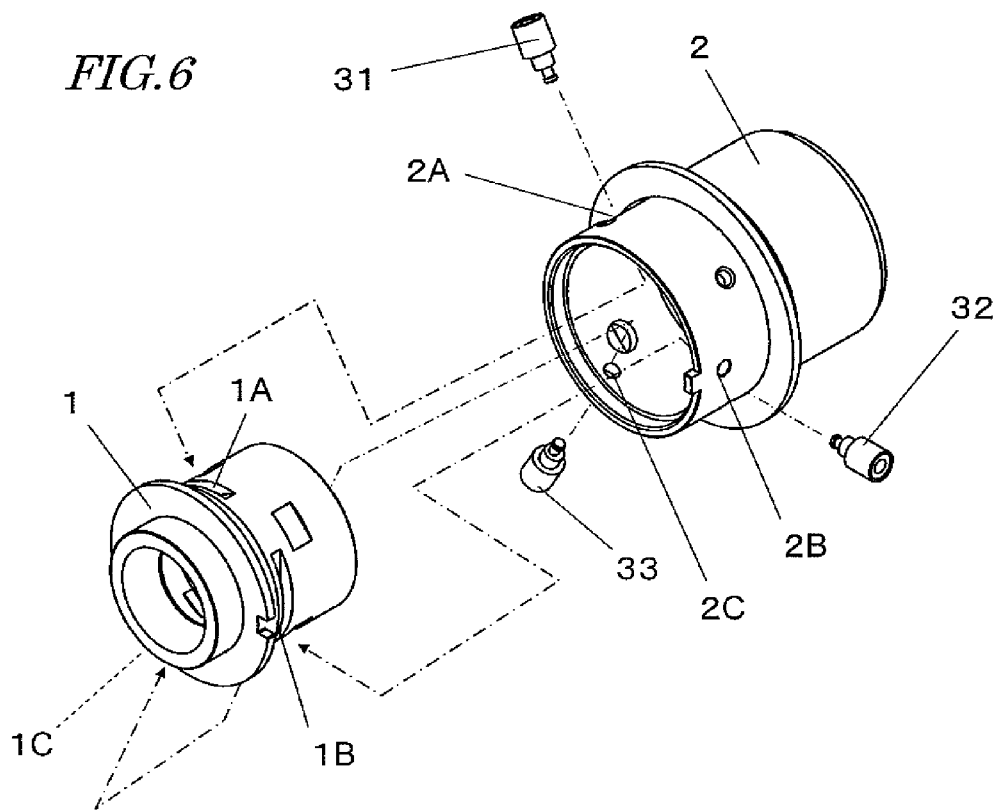
FIG. 6 Another unit exploded perspective view of a lens unit of an embodiment.

As shown in FIG. 6, as an adjustment mechanism, the lens unit has a first adjustment pin 31, a second adjustment pin 32, and a third adjustment pin 33. Moreover, it also has a first adjustment groove 1A, a second adjustment groove 1B, and a third adjustment groove 1C provided in the first lens barrel 1. The first adjustment pin 31, the second adjustment pin 32, and the third adjustment pin 33 are respectively inserted into the first adjustment groove 1A, the second adjustment groove 1B, and the third adjustment groove 1C of the first lens barrel 1, while being supported so as to be capable of rotating (axially supported) by a first guide hole 2A, a second guide hole 2B, and a third guide hole 2C which are provided in the second lens barrel 2. Hereinafter, the first adjustment pin 31, the second adjustment pin 32, and the third adjustment pin 33 may be collectively referred to as adjustment pins.

The reason why adjustment pins are provided in three places is that, once three places are determined, the attitude of the first unit 10 will be uniquely determined. If two places are determined, there will be some freedom left; if four places, there will be too much restriction. Thus, three places is optimum. However, even in the case of one place, two places, or five or more places, it is possible to adjust the adjustment of the tilt between the optical axes of the first lens barrel and the second lens barrel and their positions along the optical axis direction. Preferably, the adjustment pins are provided in three places on the outer surface of the second lens barrel 2, at an interval of 120 degrees centered around the optical axis of the second lens barrel 2.

FIG. 6 illustrates the first lens barrel 1 being disengaged from the second lens barrel 2 in order to clearly show how the first adjustment pin 31, the second adjustment pin 32, and the third adjustment pin 33 relate to the first adjustment groove 1A, the second adjustment groove 1B, and the third adjustment groove 1C; however, the first lens barrel 1 is actually partially inserted in the second lens barrel 2, and is held in place according to each association line shown in FIG. 6.

FIGS. 7(*a*), (*b*), and (*c*) are a, perspective view, a front view, and a cross-sectional view showing the shapes of the first adjustment pin 31, the second adjustment pin 32, and the third adjustment pin 33. Each of the first adjustment pin 31, the second adjustment pin 32, and the third adjustment pin 33 has a guide axis portion 3A, an eccentric portion 3B, and a manipulating portion 3C, these having an essentially cylindrical shape, for example. Perpendicularly to the direction in which the cylindrical shape extends, the manipulating portion 3C has the largest cross section, followed by the guide axis portion 3A and then by the eccentric portion 3B in descending order of cross-sectional area. As a result, there are stepped portions at boundaries between adjoining portions. As shown in FIG. 7, the eccentric axis center of the eccentric portion 3B is eccentric, by an eccentricity G3AB, with respect to the guide axis center of the guide axis portion 3A. Note that the manipulating portion 3C is disposed coaxially with respect to the guide axis portion 3A.

Moreover, a tip 3D of each adjustment pin has a bloated barrel surface, with a cross-sectional shape which is a curved cross section as shown in FIG. 7. At the tips 3D, the first adjustment pin 31, the second adjustment pin 32, and the third adjustment pin 33 are in point contact with the respective bottoms of the first adjustment groove 1A, the second adjustment groove 1B, and the third adjustment groove 1C.

Figure 9:
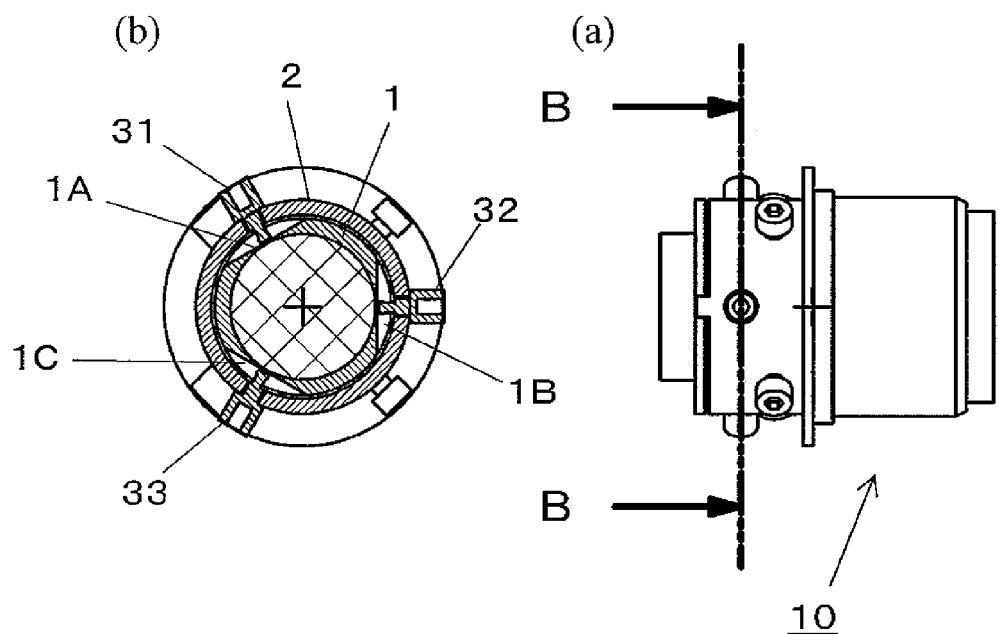
FIG. 9 (*a*) is a side view of a lens unit of an embodiment; and (*b*) is a cross-sectional view at position B-B of the view shown in (*a*).
Figure 10:
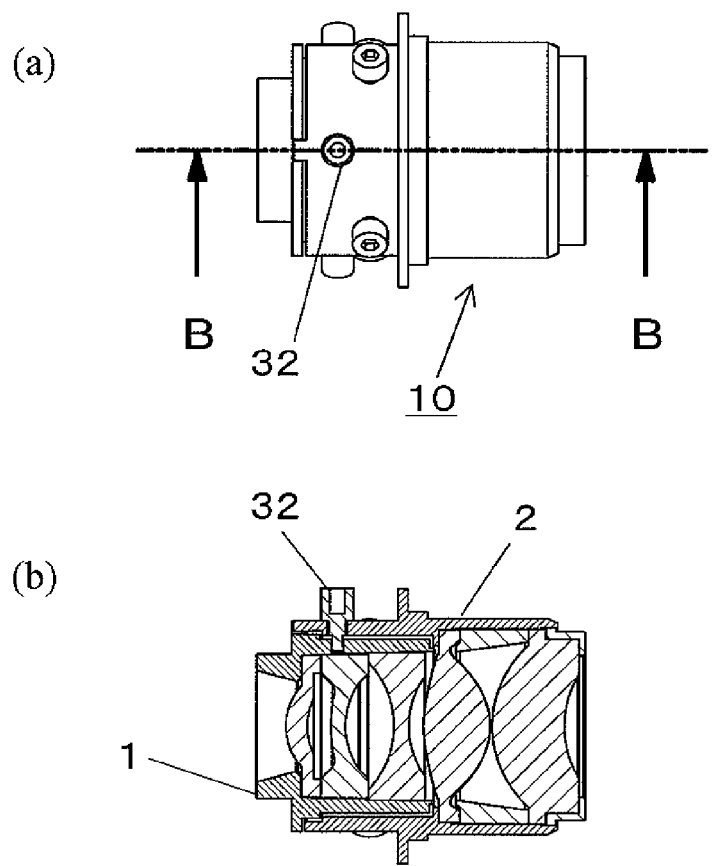
FIG. 10 (*a*) is a side view of a lens unit of an embodiment; and (*b*) is a cross-sectional view at position B-B of the view shown in (*a*).
Figure 11:
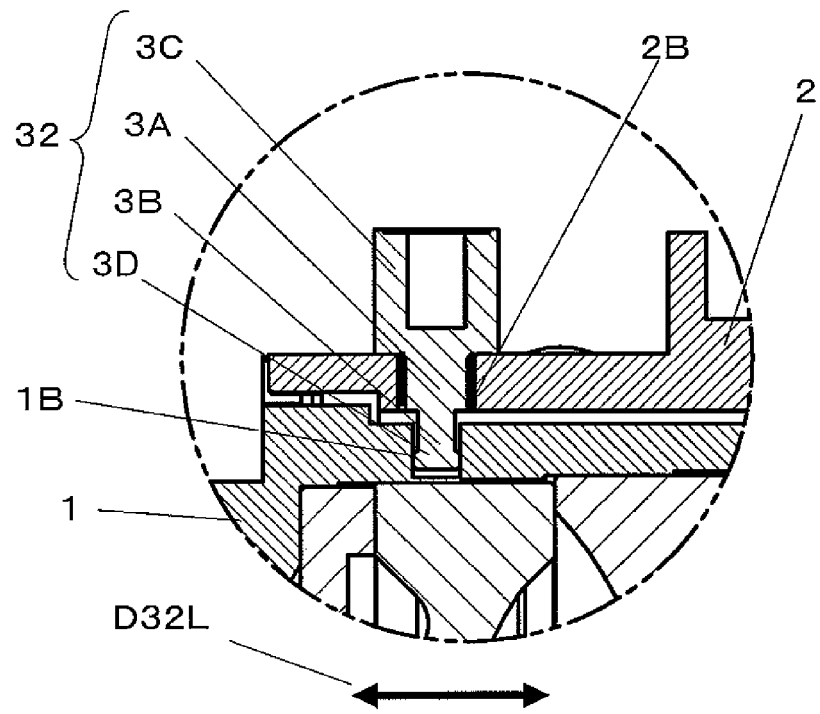
FIG. 11 An enlarged cross-sectional view of the neighborhood of an adjustment pin of a lens unit of an embodiment.

FIG. 8 specifically shows a position at which the second adjustment pin 32 is inserted into the second adjustment groove 1B. FIGS. 9(*a*) and (*b*) are a side view, and a cross-sectional view along a direction which is orthogonal to the optical axis direction, showing the first adjustment pin 31, the second adjustment pin 32, and the third adjustment pin 33 having been installed. FIGS. 10(*a*) and (*b*) are a side view, and a cross-sectional view along a direction which is parallel to the axial direction, of the same. FIG. 11 is a detailed enlarged view of the neighborhood of the second adjustment pin 32 in FIG. 10.

As shown in FIG. 6, FIG. 8, FIG. 9, FIG. 10, and FIG. 11, each of the first adjustment groove 1A, the second adjustment groove 1B, and the third adjustment groove 1C extends along the circumferential direction, and is provided in a portion of the outer surface of the first lens barrel 1. Moreover, as will be seen from FIG. 11, the adjustment groove width should be such that the tip 3D provided on the second adjustment pin 32 is insertable, and preferably, there is minimum play between them, i.e., the interspace between the inner surface of the second adjustment groove 1B and the tip 3D is as small as possible.

The guide axis portion 3A provided on the second adjustment pin 32 is axially supported so as to be capable of rotating, by the second guide hole 2B provided on the second barrel 2, such that the eccentric portion 3B and the tip 3D are eccentric with respect to the guide axis portion 3A. Therefore, when the second adjustment pin 32 rotates in an arrow D32R direction in FIG. 1, the second adjustment groove 1B moves in an arrow D32L direction. The rate of the resultant amount of move is the eccentricity G3AB per rotation by 360 degrees. The eccentricity G3AB defines the maximum adjustable dimension of the second adjustment groove 1B.

Although the construction of the second adjustment pin 32 has been described as an example, the first adjustment pin 31 and the third adjustment pin 33 accordingly have a similar construction.

The action of such structure will be described with reference to FIG. 12. The tilt (angle) between an optical axis a10 of the first unit 10 (and the first lens barrel) and an optical axis a20 of the second unit 20 (and the second lens barrel) is uniquely determined when the first adjustment groove 1A, the second adjustment groove 1B, and the third adjustment groove 1C become aligned with the first adjustment pin 31, the second adjustment pin 32, and the third adjustment pin 33.

Figure 12:
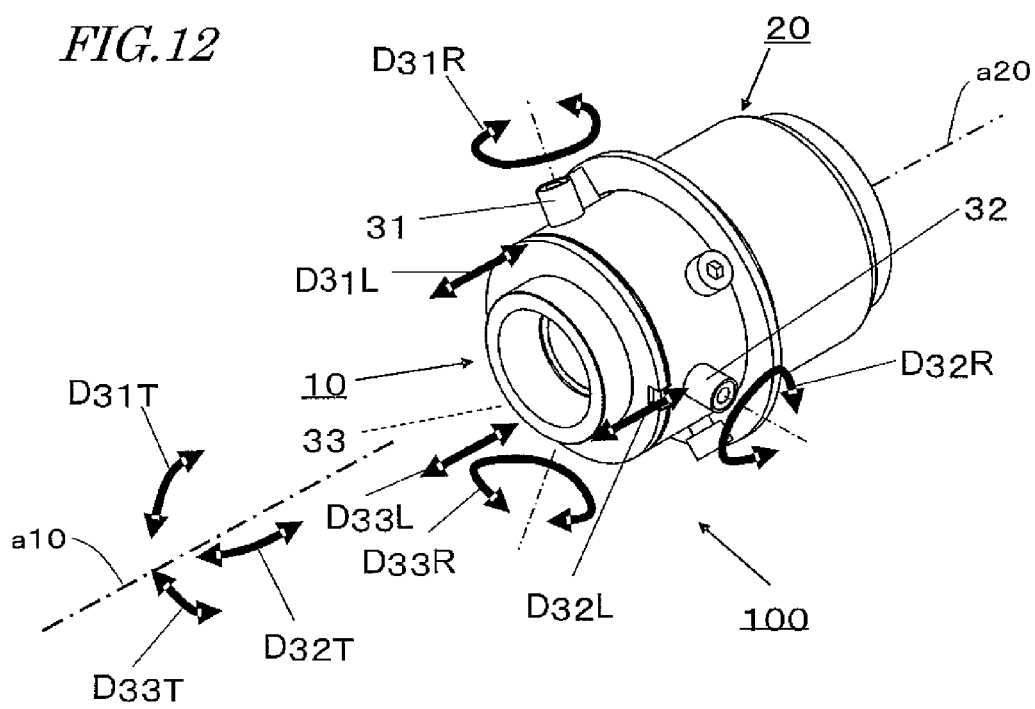
FIG. 12 A perspective view of the entire lens unit of an embodiment.

At this time, as shown in FIG. 12, if only one of the first adjustment pin 31, the second adjustment pin 32, and the third adjustment pin 33 is individually rotated along the arrow D31R direction, the arrow D32R direction, or the arrow D33R direction, the first adjustment groove 1A will move along the arrow D31L direction, the second adjustment groove 1B along the arrow D32L direction, and the third adjustment groove 1C along the arrow D33L direction, each alone by itself. As a result of this, the first unit 10 will be tilted respectively in an arrow D31T direction, a D32T direction, or a D33T direction. By utilizing this principle, the tilting angle of the optical axis a10 of the first unit 10 with respect to the optical axis a20 of the second unit 20 can be adjusted.

Rather than manipulating each adjustment pin alone, an appropriate allocation of amounts of adjustment may be used, which enables any arbitrary angle to be set. For example, by pivoting all of the first adjustment pin 31, the second adjustment pin 32, and the third adjustment pin 33 simultaneously in the same direction and with the same velocity, the first lens barrel 1 will move in parallel to the optical axis direction from the second lens barrel 2. Moreover, by allowing at least one of the three adjustment pins to pivot in a different direction or with a different velocity from the others, the optical axis a10 of the first lens barrel 1 will be tilted from the optical axis a20 of the second lens barrel 2.

Thus, when different amounts of adjustment are applied to the first adjustment pin 31, the second adjustment pin 32, and the third adjustment pin 33, their angles with the first adjustment groove 1A, the second adjustment groove 1B, and the third adjustment groove 1C will change in time during the adjustment step; however, as already described above, the tip 3D of each adjustment pin has a curved cross section to achieve point contact, thus enabling unhindered, smooth adjustment.

As shown in FIG. 13(b), end faces of the alignment guide recess 1R provided in the first barrel 1 preferably have a curved surface shape. As a result, when adjusting the tilt of the first unit 10 with respect to the second unit 20, alignment along the direction of rotation can be easily maintained without causing interference between itself and the alignment bump 2R provided on the second barrel 2.

Furthermore, when all adjustment pins are simultaneously manipulated by the same amount, the differences in axial position of the first unit 10 and the second unit 20 between portions where the adjustment pins are adjusted do not change, i.e., the tilting angle between the optical axis a10 of the first unit 10 and the optical axis a20 of the second unit 20 does not change; and yet, the axial dimension between the first unit 10 and the second unit 20 changes. By utilizing this principle, the axial position of the first unit 10 with respect to the second unit 20 can be adjusted.

Although the present embodiment illustrates the separated first adjustment groove 1A, second adjustment groove 1B, and third adjustment groove 1C as shown in FIG. 9, it will be appreciated that a circumferential adjustment groove which is entirely continuous along the circumferential direction will serve a similar function, for example.

Next, a method of adjusting a radial deviation of the first unit 10 with respect to the second unit 20 along a direction which is orthogonal to the axial direction, i.e., a radial deviation between the optical axis a10 and the optical axis 20, will be described with reference to FIG. 13 to FIG. 15.

Figure 13:
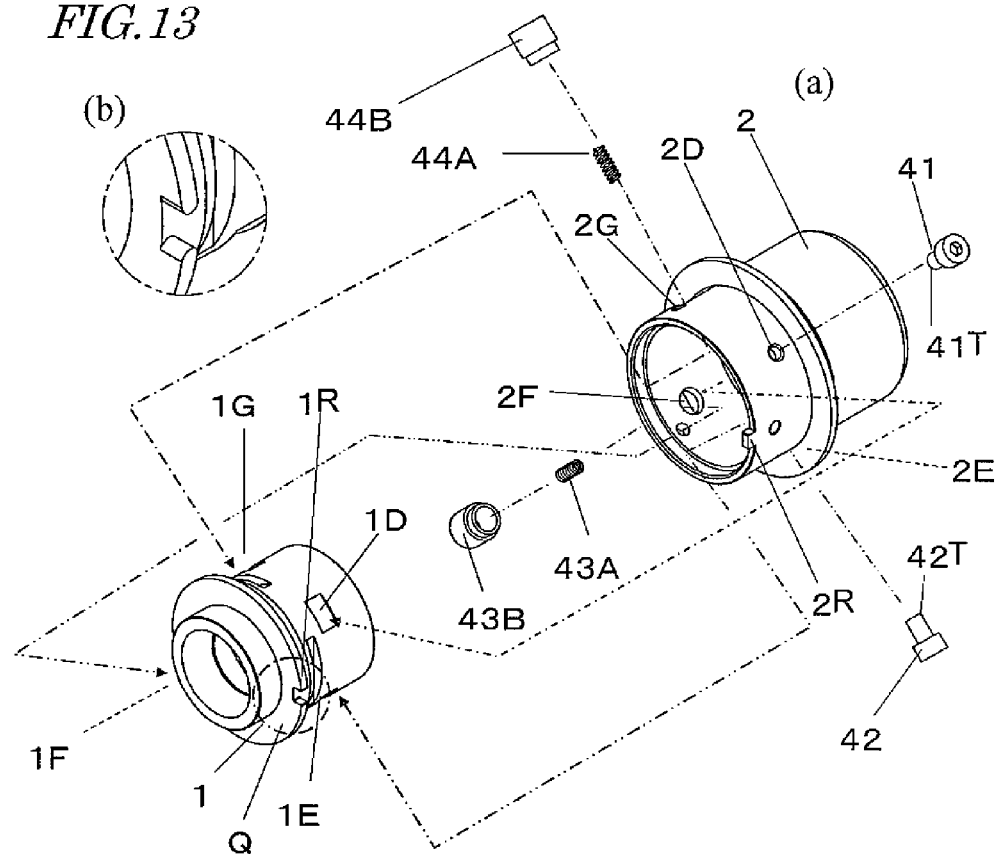
FIG. 13 (*a*) is an exploded perspective view of a lens unit of an embodiment; and (*b*) is an enlarged perspective view of the neighborhood of a recess of the first lens barrel.
Figure 14:
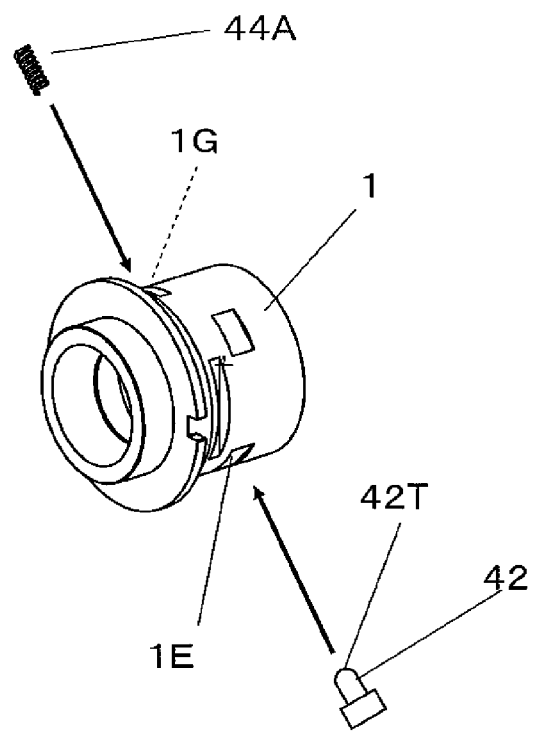
FIG. 14 A perspective view showing how a second adjustment screw of an embodiment may be installed.
Figure 15:
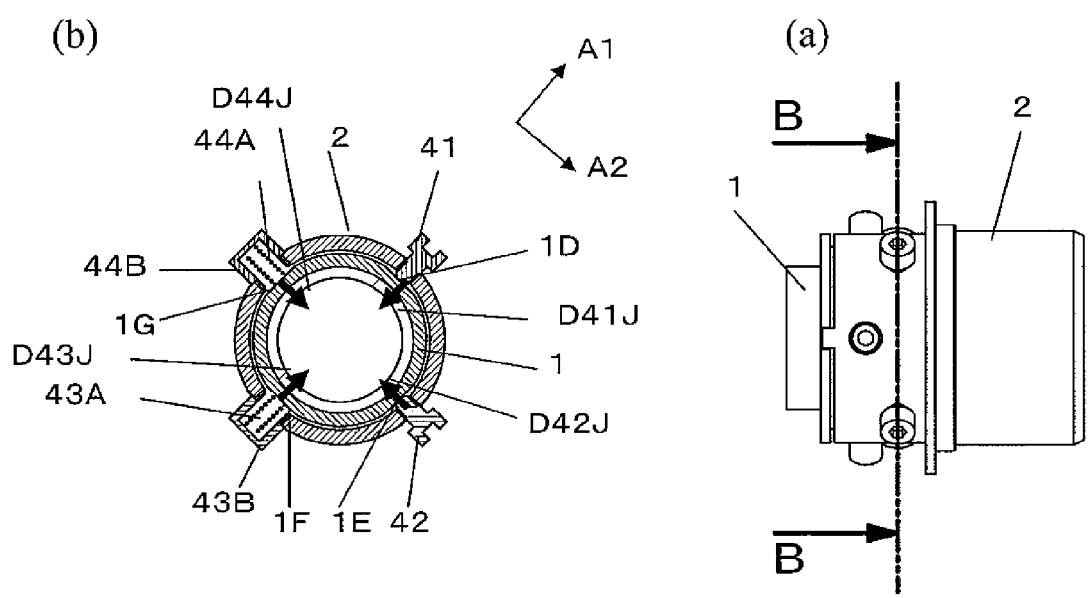
FIG. 15 (*a*) is a side view of a lens unit of an embodiment; and (*b*) is a cross-sectional view at position B-B of the view shown in (*a*).

As shown in FIG. 13 to FIG. 15, as an adjustment mechanism, the lens unit includes a first adjustment screw 41 and a second adjustment screw 42, and a first loading spring 43A and a second loading spring 44A which provide reaction forces against the first adjustment screw 41 and the second adjustment screw 42. In the present embodiment, a first spring retainer 43B and a second spring retainer 44B for retaining the first loading spring 43A and the second loading spring 44A are further provided. The first adjustment screw 41 and the second adjustment screw 42 each include a threaded screw portion, a screw head portion provided at one end of the axial direction, and a pressurizing bulge provided at the other end.

As shown in FIG. 13, the screw portions of the first adjustment screw 41 and the second adjustment screw 42 are engaged in a first adjustment screw hole 2D and a second adjustment screw hole 2E which are provided in the second lens barrel 2, thus achieving abutment against a first screw abutment face 1D and a second screw abutment face 1E provided on the first lens barrel 1.

Moreover, by means of screws or the like, the first spring retainer 43B and the second spring retainer 44B are fastened into a first spring fixing hole 2F and a second spring fixing hole 2G which are provided in the second lens barrel 2, while pressing the first adjustment spring 43 and the second adjustment spring 44 against a first spring-pressed face 1F and a second spring-pressed face 1G which are provided on the first lens barrel 1.

The first adjustment spring 43A and first adjustment spring retainer 43B, and the second adjustment spring 44A and second adjustment spring retainer 44B, are provided, respectively, at positions which are on the axes of the first adjustment screw 41 and the second adjustment screw 42 and which oppose the first adjustment screw 41 and the second adjustment screw 42 with respect to the optical axis of the second lens barrel 2. Moreover, the first adjustment screw 41, first adjustment spring 43A and first adjustment spring retainer 43B, and the second adjustment screw 42, second adjustment spring 44A and second adjustment spring retainer 44B, are disposed respectively on two lines orthogonally intersecting at a point which is on a plane perpendicular to the optical axis a10 of the first lens barrel 1 and at which the optical axis a10 is located.

Although FIG. 13 illustrates the first lens barrel 1 being disengaged from the second lens barrel in order to clearly show how the first adjustment screw 41 and the second adjustment screw 42 relate to the first screw abutment face 1D and the second screw abutment face 1E, and how the first adjustment spring 43 and the second adjustment spring 44 relate to the first spring-pressed face 1F and the second spring-pressed face 1G; however, the first lens barrel 1 is actually inserted in the second lens barrel 2, and abutment or pressing according to each association line shown in FIG. 13 occurs in this state.

FIG. 14 is a diagram showing how the second adjustment screw 42 may abut with the second screw abutment face 1E, and how the second adjustment spring 44 may press against the second spring-pressed face 1G. FIG. 15 is a diagram showing the first adjustment screw 41 and second adjustment screw 42, the first adjustment spring 43A, the first spring retainer 43B, the second loading spring 44A, and the second spring retainer 44B having been installed, in a cross section along a direction which is orthogonal to the optical axis direction.

As shown in FIG. 13, FIG. 14, and FIG. 15, the first screw abutment face 1D, the second screw abutment face 1E, the first spring-pressed face 1F, and the second spring-pressed face 1G are provided in portions of the outer surface of the first lens barrel 1. These faces are orthogonal to the axial directions of the first adjustment screw 41, the second adjustment screw 42, the first loading spring 43A, and the second loading spring 44A, respectively. As a result, it becomes possible to appropriately apply forces from the respective adjustment screws and loading springs to the first lens barrel 1.

The action of such structure will be described with reference to FIG. 1 and FIG. 15. When the first adjustment screw 41, the second adjustment screw 42, the first loading spring 43A, and the second loading spring 44A are installed in the first lens barrel 1 with appropriate abutment and pressing, the position of the first unit 20 along the arrow D41L direction and the arrow D42L direction in FIG. 1 (the position of the first unit 10 with respect to the second unit 20 along a radial direction) is uniquely determined. In this state, if the first unit 10 is eccentric from the second unit 20 along the arrow D41L direction, an adjustment is made by rotating the first adjustment screw 41 in the arrow D41R direction as appropriate. Similarly, if it is eccentric in the arrow D42L direction, an adjustment is made by rotating the second adjustment screw 42 in the arrow D42R direction as appropriate. The spring specifications are selected so that, as shown in FIG. 15, the first adjustment screw 41, the second adjustment screw 42, the first loading spring 43A, and the second loading spring 44A always exert some force in an arrow D41J direction, an arrow D42J direction, an arrow D43J direction, and an arrow D44J direction, respectively. This allows the first unit 10 to follow the movements which are caused by rotation of the first adjustment screw 41 and the second adjustment screw 42.

Moreover, as described above, the first adjustment screw 41 and the second adjustment screw 42 are orthogonal to each other, and the first screw abutment face 1D and the second screw abutment face 1E are orthogonal to each other; therefore, adjustments via the first adjustment screw 41 and the second adjustment screw 42 function independently, so that a positional adjustment along a direction A1 and a positional adjustment along a direction A2 in FIG. 15 can be made independently.

Furthermore, the pressurizing bulge 41T and the pressurizing bulge 42T of the first adjustment screw 41 and the second adjustment screw 42 have hemispheric surface shapes, thus resulting in point contact existing between the first screw abutment face 1D and the second screw abutment face 1E. As a result of this, even when adjustments made via the first adjustment pin 31, the second adjustment pin 32, and the third adjustment pin 33 introduce changes in the angles of contact between the first adjustment screw 41 and the first screw abutment face 1D and between the second adjustment screw 42 and the second screw abutment face 1E as described above, the first lens barrel 1 is allowed to undergo smooth angular changes relative to the second lens barrel 2.

With the above construction, any tilt of the optical axis, the position along the optical axis direction, and the radial deviation of the first unit 10 relative to the second unit 20 can be reliably adjusted, based on a simple construction.

In the above construction, after completion of adjustments, the first unit 10 and the second unit 20 may be fixed with an adhesively bond or the like; doing so will allow the first adjustment pin 31, the second adjustment pin 32, the third adjustment pin 33, the first adjustment screw 41, the second adjustment screw 42, the first loading spring 43A, the second loading spring 44A, the third loading spring 45A, the first spring retainer 43B, the second spring retainer 44B, and the third spring retainer 45B to be eventually removed from the completed lens unit 100. Alternatively, after completion of the above adjustments, in order to prevent the first adjustment pin 31, the second adjustment pin 32, the third adjustment pin 33, the first adjustment screw 41, and the second adjustment screw 42 from pivoting, these adjustment pins and adjustment screws may be fixed to the second lens barrel 2 with an adhesive or the like.

Note that the shapes of the adjustment pins and adjustment screws in the above embodiment are exemplary; the adjustment pins and adjustment screws may have other shapes. For example, FIGS. 16(a), (b), and (c) show a perspective view, a front view, and a cross-sectional view of a first adjustment pin 31', a second adjustment pin 32', and a third adjustment pin 33' having a different shape from that in the above embodiment.

Figure 16:
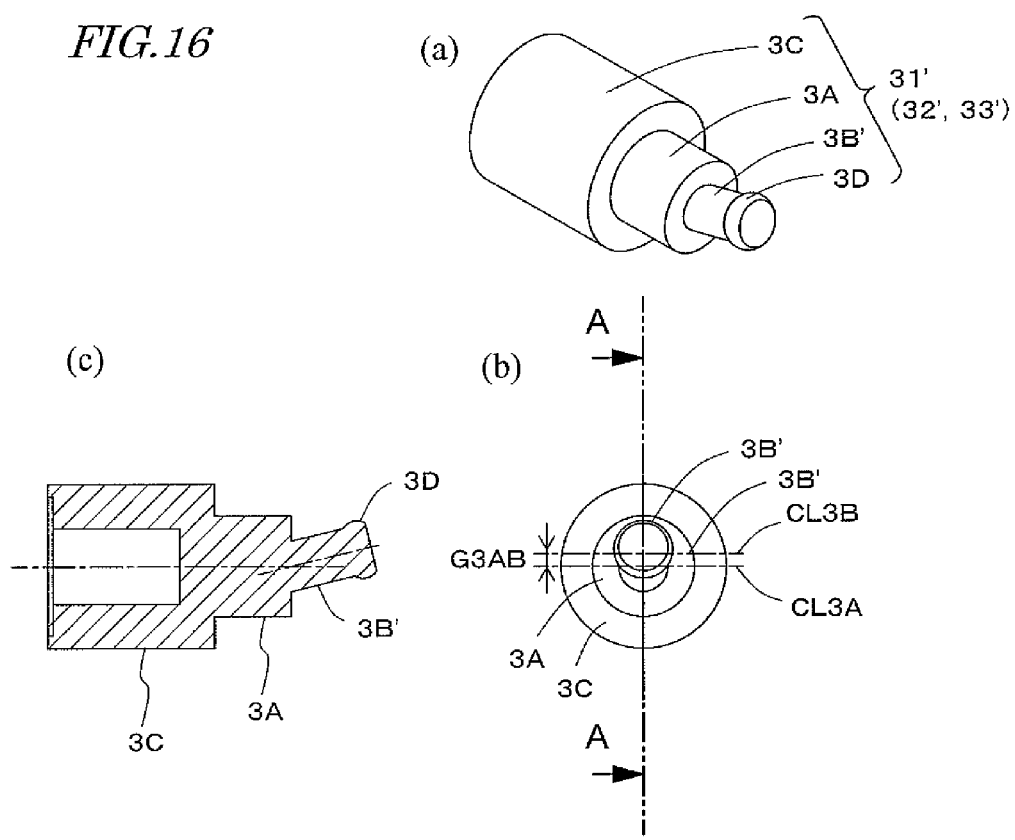
FIGS. 16 (*a*), (*b*), and (*c*) are a perspective view and a front view of a variant of the adjustment pin of an embodiment, and a cross-sectional view at position A-A of the view shown in (*b*).

Each of the first adjustment pin 31', the second adjustment pin 32', and the third adjustment pin 33' has a guide axis portion 3A, an eccentric portion 3B', and a manipulating portion 3C. As shown in FIG. 16(c), the eccentric portion 3B' has an axis center which is tilted with respect to the guide axis center of the guide axis portion 3A. Therefore, a tip 3D of the eccentric portion 3B' has an eccentric axis which is eccentric from the guide axis center.

Figure 17:
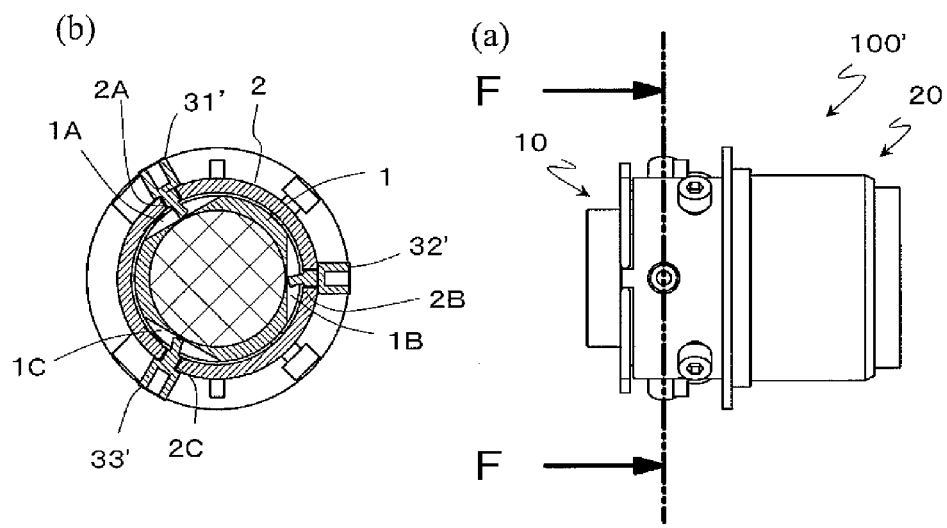
FIGS. 17 (*a*) and (*b*) are a side view of an embodiment of a lens unit in which adjustment pins as shown in FIG. 16 are used and a cross-sectional view at position F-F of the view shown in (*a*).

FIGS. 17(a) and (b) are a side view and a cross-sectional view of a lens unit 100' in which the first adjustment pin 31', the second adjustment pin 32', and the third adjustment pin 33' are used. Similarly to the above embodiment, the first adjustment pin 31', the second adjustment pin 32', and the third adjustment pin 33' are supported so as to be capable of rotating, by a first guide hole 2A, a second guide hole 2B, and a third guide hole 2C which are provided in the second lens barrel 2. Moreover, the eccentric portions 3B' and the tips 3D of the first adjustment pin 31', the second adjustment pin 32', and the third adjustment pin 33' are respectively inserted in the first adjustment groove 1A, the second adjustment groove 1B, and the third adjustment groove 1C.

The first adjustment pin 31', the second adjustment pin 32', and the third adjustment pin 33' having such structure function in similar manners to the first adjustment pin 31, the second adjustment pin 32, and the third adjustment pin 33 described in the above embodiment, and can be suitably employed in the lens unit 100 of the above embodiment, instead of the first adjustment pin 31, the second adjustment pin 32, and the third adjustment pin 33.

Figure 18:
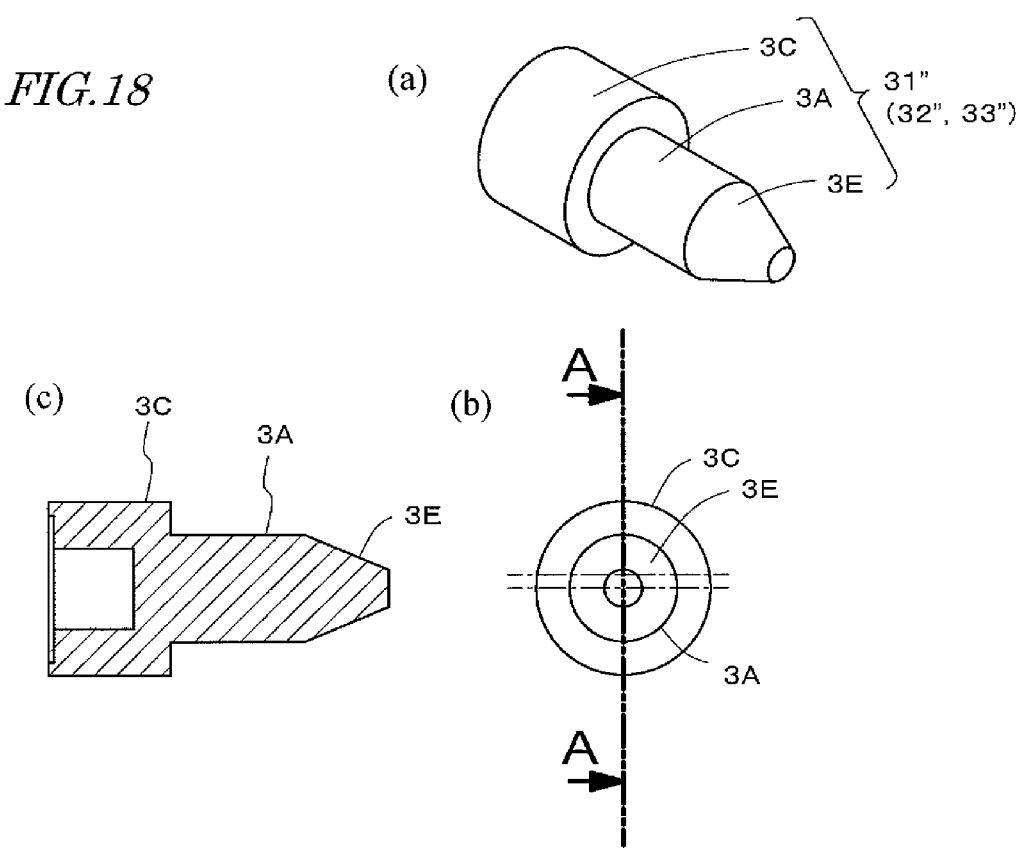
FIGS. 18 (*a*), (*b*), and (*c*) are a perspective view and a front view of a further variant of the adjustment pin of an embodiment, and a cross-sectional view at position A-A, of the view shown in (*b*).
Figure 20:
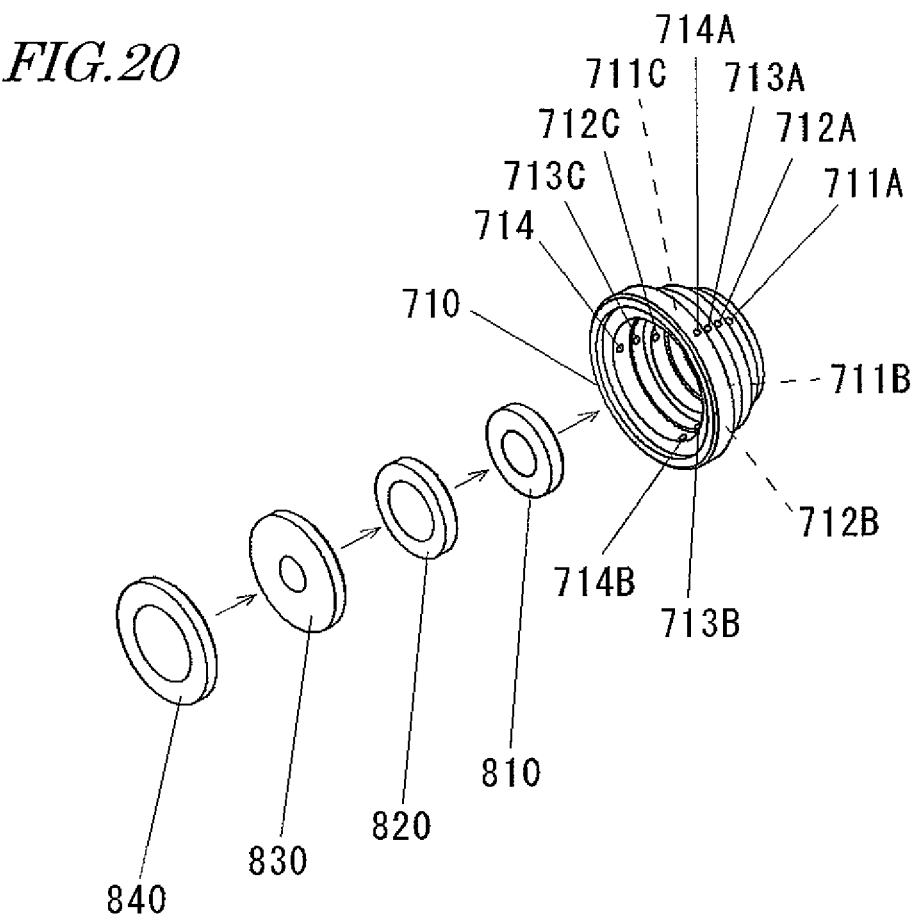
FIG. 20 An exploded perspective view showing lenses having been assembled in a lens barrel, in a conventional lens unit.
Figure 21:
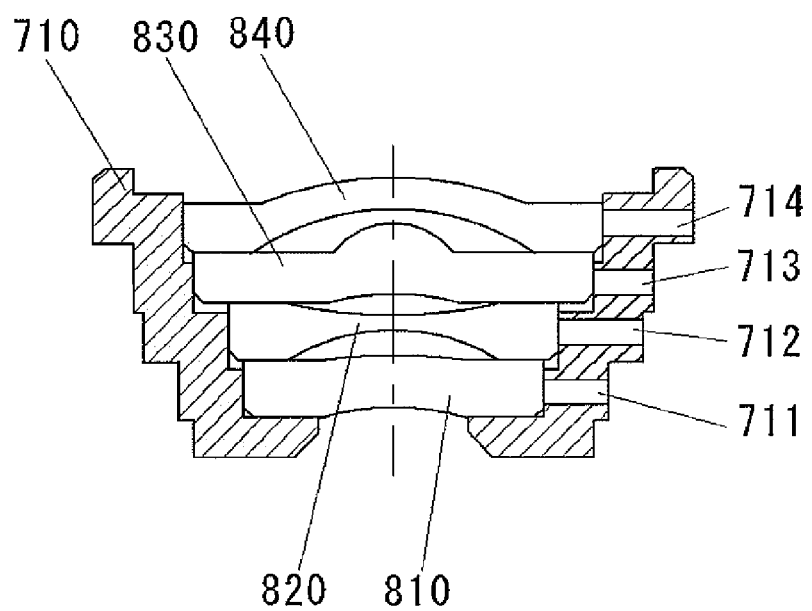
FIG. 21 A cross-sectional view showing lenses having been assembled in a lens barrel, in a conventional lens unit.

FIGS. 18(a), (b), and (c) show a perspective view, a front view, and a cross-sectional view of a first adjustment pin 31", a second adjustment pin 32", and a third adjustment pin 33" having a different shape from that in the above embodiment. As shown in these figures, each of the first adjustment pin 31", the second adjustment pin 32", and the third adjustment pin 33" has a guide axis portion 3A, a manipulating portion 3C, and a tip 3E. The tip 3E has a conical side face with a cross section which decreases away from the guide axis portion 3A and toward the leading end. The axis center of the tip 3E coincides with, and is not eccentric from, the guide axis center of the guide axis portion 3A. The side face of the guide axis portion 3A is ridged.

FIGS. 19(a), (b), and (c) are a perspective view, a side view, and a cross-sectional view of a lens unit 100" in which the first adjustment pin 31", the second adjustment pin 32", and the third adjustment pin 33" are used. In the case of using the first adjustment pin 31", the second adjustment pin 32", and the third adjustment pin 33", it is preferable that the lens unit 100" further includes springs 51 both of whose ends are connected to the first lens unit 10 and the second lens unit 20 to press the first lens unit 10 toward the second lens unit 20, as an adjustment mechanism. Moreover, the first guide hole 2A, the second guide hole 2B, and the third guide hole 2C (FIG. 6) which are provided in the second lens barrel 2 in order to support the first adjustment pin 31", the second adjustment pin 32", and the third adjustment pin 33" are preferably threaded.

As shown in FIG. 19(c), the tips 3D of the first adjustment pin 31", the second adjustment pin 32", and the third adjustment pin 33" are inserted in the first adjustment groove 1A, the second adjustment groove 1B, and the third adjustment groove 1C, such that the conical side faces of the tips 3D abut with the side walls of these adjustment grooves. Depending on the amounts of insertion of the first adjustment pin 31", the second adjustment pin 32", and the third adjustment pin 33" into the first adjustment groove 1A, the second adjustment groove 1B, and the third adjustment groove 1C, the positions at which the tips 3D abut with the adjustment grooves will change. Consequently, as has been described in the above embodiment with reference to FIG. 12, if only one of the first adjustment pin 31", the second adjustment pin 32", and the third adjustment pin 33" is individually rotated along the arrow D31R direction, the arrow D32R direction, or the arrow D33R direction, the first adjustment groove 1A will move along the arrow D31L direction, the second adjustment groove 1B along the arrow D32L direction, and the third adjustment groove 1C along the arrow D33L direction, each alone by itself. As a result of this, the first unit 10 will be tilted respectively in the arrow D31T direction, the D32T direction, or the D33T direction. By utilizing this principle, the tilting angle of the optical axis a10 of the first unit 10 with respect to the optical axis a20 of, the second unit 20 can be adjusted.

In the present embodiment, it is assumed that necessary adjustment margins in relation to the optical axis tilt, axial position, and radial deviation of the first unit 10 relative to the second unit 20 are provided between the two.

Although the above embodiments illustrate three lens and two lenses being respectively installed in the first unit 10 and the second barrel 2, it will be appreciated that the effects of the present invention can be obtained without being limited to such numbers of lenses.

In every embodiment described above, similar effects can be obtained whether resin or glass is used as the material composing the lenses. However, when the lenses are glass, the lens barrel may be metal; when the lenses are resin, the lens barrel may also be resin; in this manner, the difference in coefficient of linear expansion between the two can be reduced, which is preferable in terms of reducing deformation due to a difference between their amounts of deformation caused by temperature changes.

As for any of the lenses, the shape of the optically effective surface is not limited to the shape shown in the respective drawing, and yet effects of the present invention can be obtained.

Although the above embodiments illustrate the present invention by taking a lens unit with a fixed magnification as an example, the present invention can also be suitably used for a lens unit having a zooming function.

In the above embodiments, the adjustment mechanism of the lens unit includes adjustment pins for adjusting relative positioning along the optical axis direction and tilt between respective optical axes of the first lens barrel and the second lens barrel, and adjustment screws for adjusting their mutual radial deviation. Depending on the lens characteristics, the structure of the barrels into which lenses are installed, and the application of the lens unit, an adjustment mechanism may be provided for adjusting at least one of: relative positioning along the optical axis direction, tilt between respective optical axes, and mutual radial deviation of the first lens barrel and the second lens barrel. Moreover, screws may be provided on the adjustment pins for adjusting relative positioning along the optical axis direction and tilt between respective optical axes of the first lens barrel and the second lens barrel, such that the tips of the adjustment pins will abut also with the bottoms of the adjustment grooves, thus conferring to the adjustment pins a function of adjusting mutual radial deviation of the optical axes.

INDUSTRIAL APPLICABILITY

A lens unit according to the present invention is to be used for a camera or the like, and is useful in the case where high precision is required for the respective errors of positioning along the optical axis direction, tilt, or radial deviation of lenses which are installed in a lens barrel.

REFERENCE SIGNS LIST 1 first lens barrel
1A first adjustment groove
1B second adjustment groove
1C third adjustment groove
1D first screw abutment face
1E second screw abutment face
1F first spring-pressed face
1G second spring-pressed face
1R alignment guide recess
10 first barrel
11 first lens
12 second lens
13 third lens
2 second lens barrel
2A first guide hole
2B second guide hole
2C third guide hole
2D first adjustment screw hole
2E second adjustment screw hole
2F first spring fixing hole
2G second spring fixing hole
2R alignment bump
20 second barrel
24 fourth lens
25 fifth lens
26 spacer
27 lens retainer
31 first adjustment pin
32 second adjustment pin
33 third adjustment pin
3A guide axis portion
3B eccentric portion
3C manipulating portion
41 first adjustment screw
41T pressurizing bulge
42 second adjustment screw
42T pressurizing bulge
43A first loading spring
43B first spring retainer
44A second loading spring
44B second spring retainer

The invention claimed is:

1. A lens unit comprising:

a first lens group and a second lens group being disposed in series on a same optical axis to have a light-converging function, the first lens group and the second lens group each including at least one lens;

a first lens barrel retaining the first lens group;

a second lens barrel retaining the second lens group and encasing at least a portion of the first lens barrel; and an adjustment mechanism provided in a region of the first lens barrel and the second lens barrel where the second lens barrel encases at least a portion of the first lens barrel, the adjustment mechanism being for adjusting: relative positioning along an optical axis direction, tilt between respective optical axes, and mutual radial deviation, of the first lens barrel and the second lens barrel, wherein, for adjusting the relative positioning along the optical axis direction and the tilt between the respective optical axes, the adjustment mechanism includes three adjustment pins supported so as to be capable of pivoting on an outer surface of the second lens barrel, and three adjustment grooves being located on an outer surface of the first lens barrel and extending along a circumferential direction of the outer surface;

each of the three adjustment pins includes a guide axis portion of a cylindrical shape whose center defines a guide axis center around which the pivoting is to occur, and an eccentric portion having an eccentric axis center which is eccentric from the guide axis center and having, in at least a portion thereof, a circular cross section centered around the eccentric axis center, the guide axis portion being inserted in a guide hole so as to be capable of pivoting, the guide hole having an axis center along a radial direction of the second lens barrel, and the eccentric portion of each of the three adjustment pins being engaged in a respective one of the three adjustment grooves of the first lens barrel;

for adjusting mutual radial deviation between the first lens barrel and the second lens barrel, the adjustment mechanism further includes two adjustment screws and two loading springs, the two adjustment screws being supported by the second lens barrel so as to be capable of pivoting, and the two adjustment screws, respectively, and the two loading springs, respectively, being located on two lines orthogonally intersecting at a point on a plane which is perpendicular to the optical axis of the first lens barrel and at which the optical axis is located;

each of the two adjustment screws includes a ridged screw portion, a screw head portion located at one end along an axial direction, and a pressurizing bulge located at another end along the axial direction, the screw portion being screwed into a screw hole, an axial direction of the screw hole being a radial direction in a cross section of the second lens barrel that is perpendicular to the optical axis, and the pressurizing bulge abutting against a screw abutment face provided on an outer surface of the first lens barrel, the screw abutment face being orthogonal to an axis center of the adjustment screw;

each of the two loading springs is coaxial with a corresponding one of the two adjustment screws supported by the second lens barrel, and presses the first lens barrel from the second lens barrel toward the optical axis of the first barrel; and the screw abutment faces against which the two adjustment screws respectively abut are orthogonal to each other.

2. The lens unit of claim 1, wherein, the three adjustment pins are disposed on an outer surface of the second lens barrel at an interval of 120 degrees centered around the optical axis.

3. The lens unit of claim 1, wherein, when the three adjustment pins are simultaneously pivoted in a same direction and with a same velocity, the first lens barrel is moved relative to the second lens barrel in parallel to the optical axis direction; and when at least one of the three adjustment pins is pivoted in a different direction or with a different velocity from that of any other, the optical axis of the first lens barrel is tilted with respect to the optical axis of the second lens barrel.

4. The lens unit of claim 1, wherein the eccentric portion of each adjustment pin has a bloated barrel surface in at least a portion thereof, the eccentric portion achieving point contact with the adjustment groove at a portion of the bloated barrel surface.

5. The lens unit of claim 1, wherein the first lens barrel moves relative to the second lens barrel in a direction in which the adjustment screw proceeds when the adjustment screw is pivoted in the screw hole.

6. The lens unit of claim 1, wherein, the pressurizing bulge of each adjustment screw has a hemispheric portion, the hemispheric portion abutting against the screw abutment face; and the first lens barrel moves relative to the second lens barrel in a direction in which the adjustment screw proceeds when the adjustment screw is pivoted in the screw hole.

7. The lens unit of claim 1, wherein, among tolerances in lens assembly concerning an entire lens optics including the first lens group and the second lens group, a tolerance in assembly for satisfying a required performance between a lens of the first lens group installed in the first lens barrel that is located the closest to the second lens barrel and a lens of the second lens group installed in the second lens barrel that is located the closest to the first lens barrel is smaller than a tolerance in assembly between any other lenses.

* * * * *